US012697006B2

(12) United States Patent (10) Patent No.: US 12,697,006 B2
Artes et al. (45) Date of Patent: Aug. 4, 2026

(54) FLOOR TREATMENT BY MEANS OF AN AUTONOMOUS MOBILE ROBOT

(71) Applicant: Papst Licensing GmbH & Co. KG, St. Georgen (DE)

(72) Inventors: Harold Artes, Linz (AT); David Conti, Linz (AT); Christoph Freudenthaler, Linz (AT); Dominik Seethaler, Linz (AT); Reinhard Vogel, Linz (AT)

(73) Assignee: Papst Licensing GmbH & Co. KG, St. Georgen (DE)

( * ) Notice: Subject to any disclaimer, the term of this patent is extended or adjusted under 35 U.S.C. 154(b) by 1337 days.

(21) Appl. No.: 16/763,851

(22) PCT Filed: Nov. 16, 2018

(86) PCT No.: PCT/EP2018/081610
§ 371 (c)(1),
(2) Date: Aug. 3, 2020

(87) PCT Pub. No.: WO2019/097012
PCT Pub. Date: May 23, 2019

(65) Prior Publication Data
US 2020/0397202 A1 Dec. 24, 2020

(30) Foreign Application Priority Data

Nov. 17, 2017 (DE) ..................... 10 2017 127 180.5

(51) Int. Cl.
*A47L 9/28* (2006.01)
*G05D 1/00* (2024.01)

(52) U.S. Cl.
CPC ............. *A47L 9/281* (2013.01); *A47L 9/2826* (2013.01); *G05D 1/0219* (2013.01);
(Continued)

(58) Field of Classification Search
None
See application file for complete search history.

(56) References Cited

U.S. PATENT DOCUMENTS 4,674,048 A 6/1987 Okumura
4,740,676 A 4/1988 Satoh et al.
(Continued)

FOREIGN PATENT DOCUMENTS

AU 2015322263 4/2017
CA 2322419 9/1999
(Continued)

OTHER PUBLICATIONS

Sep. 27, 2022 Office Action issued in corresponding Japanese Patent Application No. 2020-526988 (with English language translation).
(Continued)

*Primary Examiner* — Natasha N Campbell
(74) *Attorney, Agent, or Firm* — Akerman LLP; Peter A. Chiabotti

(57) ABSTRACT

An embodiment relates to a method for controlling an autonomous mobile robot, comprising the following steps: controlling the robot in a treatment mode to treat a floor surface by means of a floor treatment module of the robot, detecting, by means of a dirt sensor mounted on the robot, a dirt sensor signal representing the soiling of the floor surface, and modifying the speed of the robot in response to the dirt sensor signal.

22 Claims, 3 Drawing Sheets

(52) U.S. Cl.
CPC ......... *G05D 1/0223* (2013.01); *G05D 1/0238* (2013.01); *G05D 1/0274* (2013.01); *A47L 2201/06* (2013.01)

(56) References Cited

U.S. PATENT DOCUMENTS

| | | | |
|---|---|---|---|
| 4,777,416 A | 10/1988 | George, II et al. | |
| 5,109,566 A | 5/1992 | Kobayashi et al. | |
| 5,260,710 A | 11/1993 | Omamyuda et al. | |
| 5,284,522 A | 2/1994 | Kobayashi et al. | |
| 5,377,106 A | 12/1994 | Drunk et al. | |
| 5,402,051 A | 3/1995 | Fujiwara et al. | |
| 5,613,261 A * | 3/1997 | Kawakami | A47L 9/2815 |
| | | | 15/52 |
| 5,696,675 A | 12/1997 | Nakamura et al. | |
| 5,787,545 A | 8/1998 | Colens | |
| 5,793,934 A | 8/1998 | Bauer | |
| 5,995,884 A | 11/1999 | Allen et al. | |
| 6,366,219 B1 | 4/2002 | Hommady | |
| 6,389,329 B1 | 5/2002 | Colens | |
| 6,532,404 B2 | 3/2003 | Colens | |
| 6,594,844 B2 | 7/2003 | Jones | |
| 6,605,156 B1 | 8/2003 | Clark et al. | |
| 6,615,108 B1 | 9/2003 | Peless et al. | |
| 6,667,592 B2 | 12/2003 | Jacobs et al. | |
| 6,690,134 B1 | 2/2004 | Jones et al. | |
| 6,732,826 B2 | 5/2004 | Song et al. | |
| 6,764,373 B1 | 7/2004 | Osawa et al. | |
| 6,781,338 B2 | 8/2004 | Jones et al. | |
| 6,809,490 B2 | 10/2004 | Jones et al. | |
| 6,965,209 B2 | 11/2005 | Jones et al. | |
| 6,972,834 B1 | 12/2005 | Oka et al. | |
| 7,155,308 B2 | 12/2006 | Jones | |
| 7,173,391 B2 | 2/2007 | Jones et al. | |
| 7,196,487 B2 | 3/2007 | Jones et al. | |
| 7,302,345 B2 | 11/2007 | Kwon et al. | |
| 7,388,343 B2 | 6/2008 | Jones et al. | |
| 7,389,156 B2 | 6/2008 | Ziegler et al. | |
| 7,448,113 B2 | 11/2008 | Jones et al. | |
| 7,483,151 B2 | 1/2009 | Zganec et al. | |
| 7,507,948 B2 | 3/2009 | Park et al. | |
| 7,539,557 B2 | 5/2009 | Yamauchi | |
| 7,571,511 B2 | 8/2009 | Jones et al. | |
| 7,636,982 B2 | 12/2009 | Jones et al. | |
| 7,656,541 B2 | 2/2010 | Waslowski et al. | |
| 7,761,954 B2 | 7/2010 | Ziegler et al. | |
| 7,801,676 B2 | 9/2010 | Kurosawa et al. | |
| 8,438,695 B2 | 5/2013 | Gilbert et al. | |
| 8,594,019 B2 | 11/2013 | Misumi | |
| 8,739,355 B2 | 6/2014 | Morse et al. | |
| 8,855,914 B1 | 10/2014 | Alexander et al. | |
| 8,892,251 B1 | 11/2014 | Dooley et al. | |
| 8,921,752 B2 | 12/2014 | Iizuka | |
| 8,982,217 B1 | 3/2015 | Hickman | |
| 9,002,511 B1 | 4/2015 | Hickerson et al. | |
| 9,026,302 B2 | 5/2015 | Stout et al. | |
| 9,037,294 B2 | 5/2015 | Chung et al. | |
| 9,043,017 B2 | 5/2015 | Jung et al. | |
| 9,149,170 B2 | 10/2015 | Ozick et al. | |
| 9,220,386 B2 | 12/2015 | Gilbert, Jr. et al. | |
| 9,486,924 B2 | 11/2016 | Dubrovsky et al. | |
| 9,717,387 B1 | 8/2017 | Szatmary et al. | |
| 10,228,697 B2 | 3/2019 | Yoshino | |
| 2002/0016649 A1 | 2/2002 | Jones | |
| 2002/0103575 A1 | 8/2002 | Sugawara | |
| 2002/0120364 A1 | 8/2002 | Colens | |
| 2003/0025472 A1 | 2/2003 | Jones et al. | |
| 2003/0030398 A1 | 2/2003 | Jacobs et al. | |
| 2003/0034441 A1 | 2/2003 | Kang et al. | |
| 2003/0120389 A1 | 6/2003 | Abramson | |
| 2003/0142925 A1 | 7/2003 | Melchior et al. | |
| 2004/0020000 A1 | 2/2004 | Jones | |
| 2004/0049877 A1 | 3/2004 | Jones et al. | |
| 2004/0187457 A1 | 9/2004 | Colens | |
| 2004/0207355 A1 | 10/2004 | Jones et al. | |

| | | | |
|---|---|---|---|
| 2005/0000543 A1 | 1/2005 | Taylor et al. | |
| 2005/0010331 A1 | 1/2005 | Taylor et al. | |
| 2005/0041839 A1 | 2/2005 | Saitou et al. | |
| 2005/0067994 A1 | 3/2005 | Jones et al. | |
| 2005/0156562 A1 | 7/2005 | Cohen et al. | |
| 2005/0171636 A1 | 8/2005 | Tani | |
| 2005/0171644 A1 | 8/2005 | Tani | |
| 2005/0204717 A1 | 9/2005 | Colens | |
| 2005/0212680 A1 | 9/2005 | Uehigashi | |
| 2005/0256610 A1 | 11/2005 | Orita | |
| 2006/0012493 A1 | 1/2006 | Karlsson et al. | |
| 2006/0020369 A1 | 1/2006 | Taylor | |
| 2006/0095158 A1 | 5/2006 | Lee et al. | |
| 2006/0237634 A1 | 10/2006 | Kim | |
| 2007/0027579 A1 | 2/2007 | Suzuki et al. | |
| 2007/0061041 A1 | 3/2007 | Zweig | |
| 2007/0234492 A1 | 10/2007 | Svendsen et al. | |
| 2007/0266508 A1 | 11/2007 | Jones et al. | |
| 2007/0282484 A1 | 12/2007 | Chung et al. | |
| 2008/0046125 A1 | 2/2008 | Myeong et al. | |
| 2008/0140255 A1 | 6/2008 | Ziegler et al. | |
| 2008/0155768 A1 | 7/2008 | Ziegler et al. | |
| 2008/0192256 A1 | 8/2008 | Wolf et al. | |
| 2008/0276407 A1 * | 11/2008 | Schnittman | B60L 50/52 |
| | | | 901/1 |
| 2008/0307590 A1 | 12/2008 | Jones et al. | |
| 2009/0048727 A1 | 2/2009 | Hong et al. | |
| 2009/0051921 A1 | 2/2009 | Masahiko | |
| 2009/0100129 A1 | 4/2009 | Vigil et al. | |
| 2009/0143912 A1 | 6/2009 | Wang et al. | |
| 2009/0177320 A1 | 7/2009 | Lee et al. | |
| 2009/0182464 A1 | 7/2009 | Myeong et al. | |
| 2009/0281661 A1 | 11/2009 | Dooley et al. | |
| 2010/0030380 A1 | 2/2010 | Shah et al. | |
| 2010/0049365 A1 | 2/2010 | Jones et al. | |
| 2010/0082193 A1 | 4/2010 | Chiappetta | |
| 2010/0257690 A1 | 10/2010 | Jones et al. | |
| 2010/0257691 A1 | 10/2010 | Jones et al. | |
| 2010/0263158 A1 | 10/2010 | Jones et al. | |
| 2010/0324731 A1 | 12/2010 | Letsky | |
| 2010/0324736 A1 | 12/2010 | Yoo et al. | |
| 2011/0054689 A1 | 3/2011 | Nielsen et al. | |
| 2011/0137461 A1 | 6/2011 | Kong et al. | |
| 2011/0194755 A1 | 8/2011 | Jeong et al. | |
| 2011/0211731 A1 | 9/2011 | Lee et al. | |
| 2011/0224824 A1 | 9/2011 | Lee et al. | |
| 2011/0231018 A1 | 9/2011 | Iwai et al. | |
| 2011/0236026 A1 | 9/2011 | Yoo et al. | |
| 2011/0238214 A1 | 9/2011 | Yoo et al. | |
| 2011/0264305 A1 | 10/2011 | Choe et al. | |
| 2011/0278082 A1 | 11/2011 | Chung et al. | |
| 2011/0295420 A1 | 12/2011 | Wagner | |
| 2012/0008128 A1 | 1/2012 | Bamji | |
| 2012/0013907 A1 | 1/2012 | Jung et al. | |
| 2012/0022785 A1 | 1/2012 | DiBernardo et al. | |
| 2012/0060320 A1 | 3/2012 | Lee et al. | |
| 2012/0069457 A1 | 3/2012 | Wolf et al. | |
| 2012/0169497 A1 | 7/2012 | Schnittman et al. | |
| 2012/0173070 A1 | 7/2012 | Schnittman | |
| 2012/0215380 A1 | 8/2012 | Fouillade et al. | |
| 2012/0221187 A1 * | 8/2012 | Jeon | G05D 1/0274 |
| | | | 701/25 |
| 2012/0223216 A1 | 9/2012 | Flaherty et al. | |
| 2012/0265370 A1 | 10/2012 | Kim et al. | |
| 2012/0271502 A1 | 10/2012 | Lee | |
| 2012/0283905 A1 | 11/2012 | Nakano et al. | |
| 2013/0001398 A1 | 1/2013 | Wada et al. | |
| 2013/0024025 A1 | 1/2013 | Hsu | |
| 2013/0166134 A1 | 6/2013 | Shitamoto | |
| 2013/0206177 A1 | 8/2013 | Burlutskiy | |
| 2013/0217421 A1 | 8/2013 | Kim | |
| 2013/0221908 A1 | 8/2013 | Tang | |
| 2013/0261867 A1 | 10/2013 | Burnett et al. | |
| 2013/0265562 A1 | 10/2013 | Tang et al. | |
| 2013/0317944 A1 | 11/2013 | Huang et al. | |
| 2014/0005933 A1 | 1/2014 | Fong et al. | |
| 2014/0098218 A1 | 4/2014 | Wu et al. | |
| 2014/0100693 A1 | 4/2014 | Fong et al. | |
| 2014/0115797 A1 | 5/2014 | Duenne | |

(56) References Cited

U.S. PATENT DOCUMENTS

| | | | |
|---|---|---|---|
| 2014/0124004 A1 | 5/2014 | Rosenstein et al. |
| 2014/0128093 A1 | 5/2014 | Das et al. |
| 2014/0156125 A1 | 6/2014 | Song et al. |
| 2014/0207280 A1 | 7/2014 | Duffley et al. |
| 2014/0207281 A1 | 7/2014 | Angle et al. |
| 2014/0207282 A1 | 7/2014 | Angle et al. |
| 2014/0218517 A1 | 8/2014 | Kim et al. |
| 2014/0257563 A1 | 9/2014 | Park et al. |
| 2014/0257564 A1 | 9/2014 | Sun et al. |
| 2014/0257565 A1 | 9/2014 | Sun et al. |
| 2014/0303775 A1 | 10/2014 | Oh et al. |
| 2014/0316636 A1 | 10/2014 | Hong et al. |
| 2014/0324270 A1 | 10/2014 | Chan et al. |
| 2014/0343783 A1 | 11/2014 | Lee |
| 2015/0006289 A1 | 1/2015 | Jakobson et al. |
| 2015/0115876 A1 | 4/2015 | Noh et al. |
| 2015/0120056 A1 | 4/2015 | Noh et al. |
| 2015/0151646 A1 | 6/2015 | Noiri |
| 2015/0166060 A1 | 6/2015 | Smith |
| 2015/0168954 A1 | 6/2015 | Hickerson et al. |
| 2015/0173578 A1 | 6/2015 | Kim et al. |
| 2015/0202772 A1 | 7/2015 | Kim |
| 2015/0212520 A1 | 7/2015 | Artes et al. |
| 2015/0223659 A1 | 8/2015 | Han et al. |
| 2015/0260829 A1 | 9/2015 | Wada |
| 2015/0265125 A1 | 9/2015 | Lee et al. |
| 2015/0269823 A1 | 9/2015 | Yamanishi et al. |
| 2015/0314453 A1 | 11/2015 | Witelson et al. |
| 2015/0367513 A1 | 12/2015 | Gettings et al. |
| 2016/0008982 A1 | 1/2016 | Artes et al. |
| 2016/0026185 A1 | 1/2016 | Smith et al. |
| 2016/0037983 A1 | 2/2016 | Hillen et al. |
| 2016/0041029 A1 | 2/2016 | T'ng et al. |
| 2016/0066759 A1 | 3/2016 | Miele et al. |
| 2016/0103451 A1 | 4/2016 | Vicenti |
| 2016/0123618 A1 | 5/2016 | Hester et al. |
| 2016/0132056 A1 | 5/2016 | Yoshino |
| 2016/0150933 A1 | 6/2016 | Duenne et al. |
| 2016/0165795 A1 | 6/2016 | Balutis et al. |
| 2016/0166126 A1 | 6/2016 | Morin et al. |
| 2016/0200161 A1 | 7/2016 | Van Den Bossche et al. |
| 2016/0209217 A1 | 7/2016 | Babu et al. |
| 2016/0213218 A1 | 7/2016 | Ham et al. |
| 2016/0214258 A1 | 7/2016 | Yan |
| 2016/0229060 A1 | 8/2016 | Kim et al. |
| 2016/0271795 A1 | 9/2016 | Vicenti |
| 2016/0278090 A1 | 9/2016 | Moeller et al. |
| 2016/0282873 A1 | 9/2016 | Masaki et al. |
| 2016/0297072 A1 | 10/2016 | Williams et al. |
| 2016/0298970 A1 | 10/2016 | Lindhe et al. |
| 2017/0001311 A1 | 1/2017 | Bushman et al. |
| 2017/0083022 A1 | 3/2017 | Tang |
| 2017/0147000 A1 | 5/2017 | Hoennige et al. |
| 2017/0164800 A1 | 6/2017 | Arakawa |
| 2017/0177001 A1 | 6/2017 | Cao et al. |
| 2017/0197314 A1 | 7/2017 | Stout et al. |
| 2017/0231452 A1 | 8/2017 | Saito et al. |
| 2017/0273528 A1 | 9/2017 | Watanabe |
| 2017/0364087 A1 | 12/2017 | Tang et al. |
| 2018/0004217 A1 | 1/2018 | Biber |
| 2018/0074508 A1 | 3/2018 | Kleiner et al. |
| 2020/0348666 A1 | 11/2020 | Han |

FOREIGN PATENT DOCUMENTS

| | | |
|---|---|---|
| CN | 1381340 | 11/2002 |
| CN | 101920498 | 12/2010 |
| CN | 101945325 | 1/2011 |
| CN | 101972129 | 2/2011 |
| CN | 102407522 | 4/2012 |
| CN | 102738862 | 10/2012 |
| CN | 102866706 | 1/2013 |
| CN | 103885444 | 6/2014 |
| CN | 203672362 | 6/2014 |
| CN | 104115082 | 10/2014 |
| CN | 104460663 | 3/2015 |
| CN | 104634601 | 5/2015 |
| CN | 104765362 | 7/2015 |
| CN | 105045098 | 11/2015 |
| CN | 105334847 | 2/2016 |
| CN | 105467398 | 4/2016 |
| CN | 105527619 | 4/2016 |
| CN | 105593775 | 5/2016 |
| CN | 105990876 | 10/2016 |
| DE | 4421805 | 8/1995 |
| DE | 10204223 | 8/2003 |
| DE | 10261787 | 1/2004 |
| DE | 60002209 | 3/2004 |
| DE | 69913150 | 8/2004 |
| DE | 102007016802 | 5/2008 |
| DE | 102008028931 | 6/2008 |
| DE | 102008014912 | 9/2009 |
| DE | 102009059217 | 2/2011 |
| DE | 102009041362 | 3/2011 |
| DE | 102009052629 | 5/2011 |
| DE | 102010000174 | 7/2011 |
| DE | 102010000317 | 8/2011 |
| DE | 102010000607 | 9/2011 |
| DE | 102010017211 | 12/2011 |
| DE | 102010017689 | 1/2012 |
| DE | 102010033768 | 2/2012 |
| DE | 102011050357 | 2/2012 |
| DE | 102012201870 | 8/2012 |
| DE | 102011006062 | 9/2012 |
| DE | 102011051729 | 1/2013 |
| DE | 102012211071 | 11/2013 |
| DE | 102012105608 | 1/2014 |
| DE | 102012109004 | 3/2014 |
| DE | 202014100346 | 3/2014 |
| DE | 102012112035 | 6/2014 |
| DE | 102012112036 | 6/2014 |
| DE | 102013100192 | 7/2014 |
| DE | 102014110265 | 7/2014 |
| DE | 102014113040 | 9/2014 |
| DE | 102013104399 | 10/2014 |
| DE | 102013104547 | 11/2014 |
| DE | 102015006014 | 5/2015 |
| DE | 102014012811 | 10/2015 |
| DE | 102015119501 | 11/2015 |
| DE | 102014110104 | 1/2016 |
| DE | 102016102644 | 2/2016 |
| DE | 102016114594 | 2/2018 |
| DE | 102016125319 | 6/2018 |
| EP | 142594 | 5/1985 |
| EP | 402764 | 12/1990 |
| EP | 0769923 | 5/1997 |
| EP | 1062524 | 12/2000 |
| EP | 1342984 | 9/2003 |
| EP | 1533629 | 5/2005 |
| EP | 1553536 | 7/2005 |
| EP | 1557730 | 7/2005 |
| EP | 1621948 | 2/2006 |
| EP | 1942313 | 7/2008 |
| EP | 1947477 | 7/2008 |
| EP | 1983396 | 10/2008 |
| EP | 2027806 | 2/2009 |
| EP | 2053417 | 4/2009 |
| EP | 2078996 | 7/2009 |
| EP | 2287697 | 2/2011 |
| EP | 2327957 | 6/2011 |
| EP | 1941411 | 9/2011 |
| EP | 2407847 | 1/2012 |
| EP | 2450762 | 5/2012 |
| EP | 2457486 | 5/2012 |
| EP | 2498158 | 9/2012 |
| EP | 2502539 | 9/2012 |
| EP | 2511782 | 10/2012 |
| EP | 2515196 | 10/2012 |
| EP | 2573639 | 3/2013 |
| EP | 2595024 | 5/2013 |
| EP | 2740013 | 6/2014 |
| EP | 2741159 | 6/2014 |
| EP | 2821876 | 1/2015 |
| EP | 2853976 | 4/2015 |

(56) References Cited

FOREIGN PATENT DOCUMENTS

| | | |
|---|---|---|
| EP | 2752726 | 5/2015 |
| EP | 2870852 | 5/2015 |
| EP | 3079030 | 11/2015 |
| EP | 3156873 | 4/2017 |
| EP | 3184013 | 6/2017 |
| GB | 2509989 | 7/2014 |
| GB | 2509990 | 7/2014 |
| GB | 2509991 | 7/2014 |
| GB | 2513912 | 11/2014 |
| JP | H04338433 | 11/1992 |
| JP | H10501908 A | 2/1998 |
| JP | 2001125641 | 5/2001 |
| JP | 2002085305 | 3/2002 |
| JP | 2003330543 | 11/2003 |
| JP | 2004133882 | 4/2004 |
| JP | 2005205028 | 8/2005 |
| JP | 2007519468 A | 7/2007 |
| JP | 2008140159 | 6/2008 |
| JP | 2009123045 | 6/2009 |
| JP | 2009238055 | 10/2009 |
| JP | 2009301247 | 12/2009 |
| JP | 2010066932 | 3/2010 |
| JP | 2010227894 | 10/2010 |
| JP | 2013077088 | 4/2013 |
| JP | 2013146302 | 8/2013 |
| JP | 2014509211 A | 4/2014 |
| JP | 2014176260 | 9/2014 |
| JP | 201541203 | 3/2015 |
| JP | 2016192040 | 11/2016 |
| JP | 2016201095 | 12/2016 |
| KR | 100735565 | 5/2006 |
| KR | 20070045641 | 5/2007 |
| KR | 100815545 | 3/2008 |
| KR | 20090013523 | 2/2009 |
| KR | 20110092158 | 8/2011 |
| KR | 20140073854 | 6/2014 |
| KR | 20140145648 | 12/2014 |
| KR | 20150009413 | 1/2015 |
| KR | 20150050161 | 5/2015 |
| KR | 20150086075 | 7/2015 |
| KR | 20150124011 | 11/2015 |
| KR | 20150124013 | 11/2015 |
| KR | 20150124014 | 11/2015 |
| KR | 20150127937 | 11/2015 |
| KR | 101640706 | 7/2016 |
| KR | 20160097051 | 8/2016 |
| WO | 9523346 | 8/1995 |
| WO | 9928800 | 6/1999 |
| WO | 200004430 | 1/2000 |
| WO | 2005074362 | 8/2005 |
| WO | 2007028667 | 3/2007 |
| WO | 2011074165 | 6/2011 |
| WO | 2012099694 | 7/2012 |
| WO | 2012157951 | 11/2012 |
| WO | 2013116887 | 8/2013 |
| WO | 2014017256 | 1/2014 |
| WO | 2014043732 | 3/2014 |
| WO | 2014055966 | 4/2014 |
| WO | 2014113091 | 7/2014 |
| WO | 2014138472 | 9/2014 |
| WO | 2015018437 | 2/2015 |
| WO | 2015025599 | 2/2015 |
| WO | 2015072897 | 5/2015 |
| WO | 2015082017 | 6/2015 |
| WO | 2015090398 | 6/2015 |
| WO | 2015158240 | 10/2015 |
| WO | 2015181995 | 12/2015 |
| WO | 2016019996 | 2/2016 |
| WO | 2016027957 | 2/2016 |
| WO | 2016028021 | 2/2016 |
| WO | 2016031702 | 3/2016 |
| WO | 2016048077 | 3/2016 |
| WO | 2016050215 | 4/2016 |
| WO | 2016091312 | 6/2016 |
| WO | 2016095966 | 6/2016 |

OTHER PUBLICATIONS

Vasquez-Gomez et al., "View planning for 3D object reconstruction with a mobile manipulator robot," 2014 IEEE/RSJ International Conference on Intelligent Robots and Systems, Sep. 14, 2014 IEEE, pp. 4227-4233.

Choset et al., "Principles Of Robot Motion", Theory, Algorithms, and Implementations, Chapter 6—Cell decompositions, 2004, document of 41 pages.

Durrant-Whyte et al., "Simultaneous Localization and Mapping (SLAM): Part I The Essential Algorithms", in: IEEE Robotics and Automation Magazine, vol. 13, No. 2, pp. 99-108, Jun. 2006.

Forlizzi, How robotic products become social products: An ethnographic study of cleaning in the home, 2007, IEEE, p. 129-136 (Year: 2007).

Kim et al., "User-Centered Approach to Path Planning of Cleaning Robots: Analyzing User's Cleaning Behavior." Proceedings of the 2007 ACM/IEEE Conference on Human-Robot Interaction, Mar. 8-11, 2007, pp. 373-380.

Konolige et al., "A Low-Cost Laser Distance Sensor," 2008 IEEE International Conference on Robotics and Automation, Pasadena, CA, USA, May 19-23, 2008, document of 7 pages.

Lymberopoulos et al., "A Realistic Evaluation and Comparison of Indoor Location Technologies: Experiences and Lessons Learned," IPSN '15, Apr. 14-16, 2015, Seattle, WA, USA, document of 12 pages. http://dx.doi.org/10.1145/2737095.27.

Mahyuddin et al., "Neuro-fuzzy algorithm implemented in Altera's FPGA for mobile robot's obstacle avoidance mission", TENCON 2009—2009 IEEE Region 10 Conference, IEEE, Piscataway, NJ, USA, Jan. 23, 2009; document of 6 pages.

Neto et al., Human-Machine Interface Based on Electro-Biological Signals for Mobile Vehicles, 2006, IEEE, p. 2954-2959 (Year: 2006).

Oh et al., "Autonomous Battery Recharging for Indoor Mobile Robots," Massachusetts Institute of Technology Press, Aug. 30, 2000, document of 6 pages, XP055321836.

Sick Sensor Intelligence, "LMS200/211/221/291 Laser Measurement Systems", Jan. 2007, pp. 1-48, XP055581229, http://sicktoolbox.sourceforge.net/docs/sick-lms-technical-description.pdf.

Siegwart, "Introduction to Autonomous Mobile Robots", Massachusetts, ISBN 978-0-26-219502-7, (2004), pp. 104-115, 151-163, 250-251, document of 37 pages. http://www.robotee.com/EBooks/Introduction_to_Autonomous_Mobile_Robots.pdf, XP055054850.

World Intellectual Property Office, "International Search Report" and English translation thereof, issued in International Application No. PCT/EP2018/081610, document of 9 pages, dated Apr. 2, 2019.

* cited by examiner

FLOOR TREATMENT BY MEANS OF AN AUTONOMOUS MOBILE ROBOT

CROSS REFERENCE TO RELATED APPLICATIONS

This application is a § 371 National Phase of PCT/EP2018/081610, filed Nov. 16, 2018, the entirety of which is incorporated by reference and which claims priority to German Patent Application No. 10 2017 127 180.5, filed Nov. 17, 2017.

TECHNICAL FIELD

The description relates to the field of autonomous mobile robots for treating surfaces.

BACKGROUND

In recent years, autonomous mobile robots have increasingly been used for treating (especially cleaning) a floor surface, for example. In this context, it is important to treat a certain surface completely with a surface treatment device mounted to the robot, such as a brush. Simple devices do not require the creation and use of a map of the application area of the robot, as they move randomly over the surface to be cleaned, for example. More complex robots use a map of the application area of the robot, which map they create themselves or which are made available to them in electronic form. These systems make it possible to remember which surfaces have already been treated.

Modern autonomous mobile robots, which use a map of the application area of the robot for navigation, can try to use a treatment mode with a movement or treatment pattern that is as systematic as possible when treating (e.g., cleaning) a surface. This pattern has to be adapted to the complex environment in the application area of the robot, such as in an apartment with furniture. In addition, the robot must be capable of reacting to unexpected circumstances, such as people moving in its application area or obstacles that are difficult to detect with the robot's sensors or particularly heavily soiled areas.

The specific path planning (trajectory planning) therein depends on the treatment pattern as well as on the collision avoidance strategy used in the respective treatment mode. The manner in which untreated sections are handled can also depend on the treatment mode. A treatment mode for treating a floor surface is thus characterized, among other factors, by the motion pattern (e.g., meander, spiral, etc.) with which the robot tries to cover the floor surface, the respective speed at which it travels, the collision avoidance strategy used and the strategy for treating previously untreated sections of the floor surface (which were omitted due to obstacles, e.g.). Various approaches (treatment modes) for the robot-assisted treatment of a floor surface have been described, e.g., in the publication DE 10 2015 119 865 A1.

Generally speaking, the problem underlying the present disclosure can be understood to be the improvement of existing robotic methods for an autonomous mobile robot for treating a surface (e.g., for cleaning a floor surface), in order to increase the efficiency of the robot.

SUMMARY

The aforementioned problem can be solved with a method and an autonomous mobile robot having the features and structures recited herein.

An exemplary embodiment relates to a method for controlling an autonomous mobile robot, comprising the following steps: controlling the robot in a treatment mode to treat a floor surface by means of a floor treatment module of the robot; detecting, by means of a dirt sensor mounted on the robot, a dirt sensor signal representing the level of soiling of the floor surface; and modifying the speed of the robot in response to the dirt sensor signal.

Another exemplary embodiment relates to a method that comprises the following: controlling the robot in a treatment mode for treating the floor surface by means of a treatment module of the robot; and creating a treatment map in which treated areas of the floor surface are marked and by means of which it is determined which areas are still to be treated. The method further comprises detecting a dirt sensor signal representing the level of soiling of the floor surface by means of a dirt sensor mounted on the robot, and the marking or non-marking of an area dependent on the current robot position in the treatment map as "treated" depending on the dirt sensor signal.

Another exemplary embodiment relates to a method that comprises the following: controlling the robot in a treatment mode for treating the floor surface and creating an intensity map in which different positions or areas on the floor surface are associated with a measure of the intensity of treating the floor surface.

Furthermore, an autonomous mobile robot with a control unit is described, which control unit is designed to cause the robot to execute one or multiple methods described here.

BRIEF DESCRIPTION OF THE DRAWINGS

Various exemplary embodiments are explained in more detail below on the basis of the drawings. The representations are not necessarily true to scale, and the present disclosure is not limited to the aspects presented therein. Rather, the drawings intend to illustrate the underlying principles. The drawings show.

DETAILED DESCRIPTION

Figure 1:
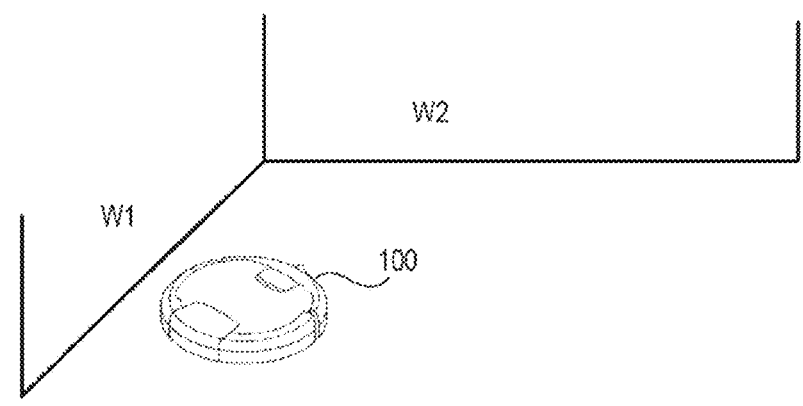
FIG. 1 A representation of an autonomous mobile robot in an application area of the robot FIG. 2 An exemplary design of an autonomous mobile robot, illustrated by means of a block diagram FIG. 3 The functional interaction of the sensor unit and control software of an autonomous mobile robot, illustrated by means of a block diagram FIG. 4 A flowchart representing an example of the method described here FIGS. 5A-5E An exemplary movement pattern of an autonomous mobile robot when treating a floor surface according to the exemplary embodiments described here

FIG. 1 illustrates an example of an autonomous mobile robot 100 for treating a floor surface. Modern autonomous mobile robots 100 navigate based on maps, i.e., they have access to an electronic map of the application area of the robot. As the robot moves through the application area, the robot detects obstacles. Obstacles can be objects such as furniture, walls, doors, etc. However, the robot can also detect people or animals as obstacles. In the example shown here, the robot 100 has already detected portions of the walls W1 and W2 of a room. Methods for creating and updating maps and determining the position of the autonomous mobile robot 100 with respect to this map in the application area of the robot are known in principle. SLAM methods can be used for this purpose, for example (SLAM: Simultaneous Localization and Mapping).

Figure 2:
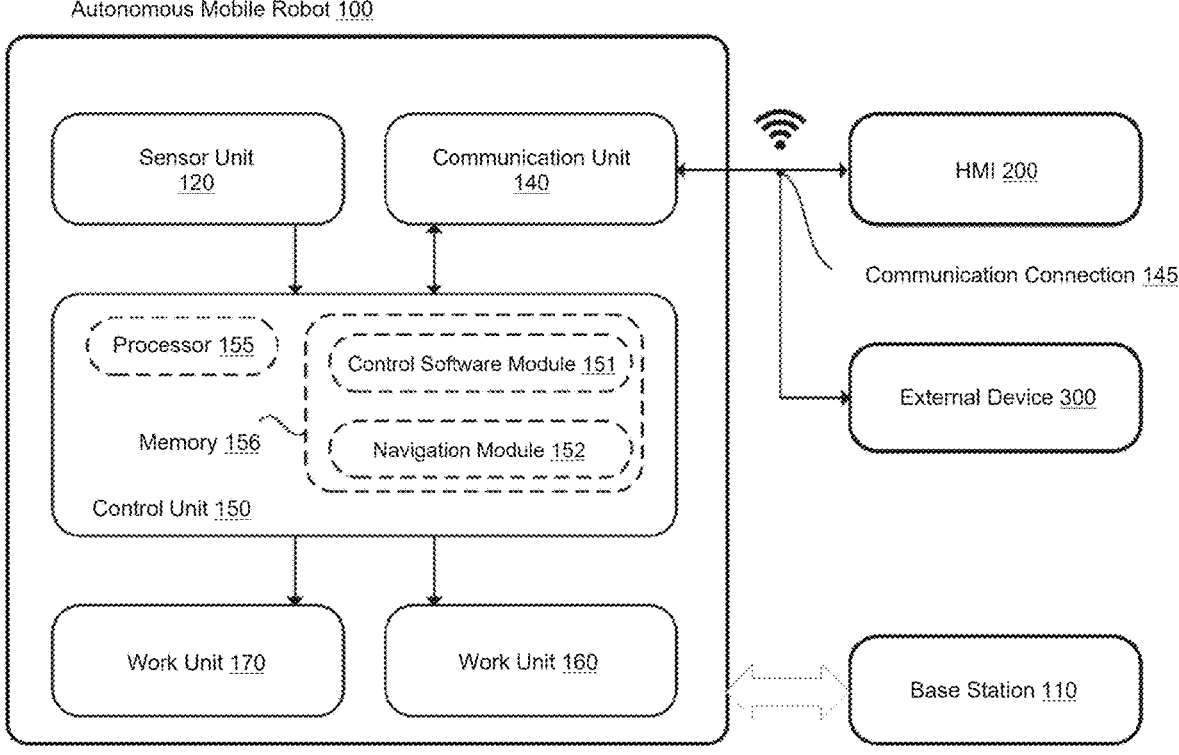

FIG. 2 shows examples of various units (modules) of an autonomous mobile robot 100 by means of a block diagram. A unit or module can be a stand-alone assembly or part of a software to control the robot. A unit can have multiple subunits. The software responsible for the behavior of the robot 100 can be executed by the control unit 150 of the robot 100. In the example shown here, the control unit 150 contains a processor 155, which is designed to execute software instructions contained in a memory 156. Some functions of the control unit 150 can also be performed at least partially with the help of an external computer. This means that the computing power required by the control unit 150 can be at least partially outsourced to an external computer, which can be accessible, for example, via a home network or via the Internet (cloud).

The autonomous mobile robot 100 comprises a drive unit 170, which can have, for example, electric motors, gears and wheels, whereby the robot 100 can—at least theoretically— reach any point of an application area. The drive unit 170 is designed to convert commands or signals received from the control unit 150 into a movement of the robot 100.

The autonomous mobile robot 100 also comprises a communication unit 140 for establishing a communication connection 145 to a human-machine interface (HMI) 200 and/or other external devices 300. For example, the communication connection 145 can be a direct wireless connection (e.g., Bluetooth), a local wireless network connection (e.g., Wi-Fi or ZigBee), or an Internet connection (e.g., to a cloud service). The human-machine interface 200 can output information about the autonomous mobile robot 100 to a user, for example in visual or acoustic form (e.g., battery status, current work order, map information such as a cleaning map, etc.) and receive user commands for a work order for the autonomous mobile robot 100. Examples of an HMI 200 include tablet PCs, smartphones, smartwatches and other wearables, computers, smart TVs, or head-mounted displays, etc. An HMI 200 can additionally or alternatively be integrated directly into the robot, whereby the robot 100 can be operated, for example, via keys, gestures and/or voice input and output.

Examples of external devices 300 are computers and servers on which calculations are performed and/or data are stored, external sensors providing additional information, or other household appliances (e.g., other autonomous mobile robots), with which the autonomous mobile robot 100 can collaborate and/or exchange information.

The autonomous mobile robot 100 can have a work unit 160, in particular a treatment unit for treating (e.g. cleaning) a floor surface. Such a treatment unit may comprise, for example, a suction unit for generating an air flow that picks up dirt, or comprise brushes or other cleaning devices. Alternatively or additionally, the robot may be designed to apply and process a cleaning fluid on the floor surface.

The autonomous mobile robot 100 comprises a sensor unit 120 with various sensors, for example one or multiple sensors for acquiring information about the environment of the robot in its application area, such as the position and expansion of obstacles or other landmarks in the application area. Sensors for collecting information about the environment are, for example, sensors for measuring distances to objects (e.g. walls or other obstacles, etc.) in the environment of the robot. For this purpose, different sensors are known, such as optical and/or acoustic sensors, which can measure distances by means of triangulation or runtime measurement of an emitted signal (triangulation sensor, 3D camera, laser scanner, ultrasonic sensors, etc.). Alternatively or additionally, a camera can be used to collect information about the environment. Especially when viewing an object from two or more positions, the position and expansion of an object (obstacle) can also be determined.

In addition, the robot can have sensors to detect a (usually unintentional) contact (or collision) with an obstacle. This can be realized by accelerometers (which detect, e.g., the change in speed of the robot in the event of a collision), contact switches, capacitive sensors or other tactile or touch-sensitive sensors. In addition, the robot can have ground sensors (also known as drop sensors) to detect a drop-off edge on the ground, such as a stair step. Other typical sensors in the field of autonomous mobile robots are sensors for determining the speed and/or distance traveled of the robot, such as odometers or inertial sensors (acceleration sensor, rotational speed sensor) for determining the changes in position and motion of the robot, as well as wheel contact switches to detect a contact between the wheel and the floor.

In addition, the robot can have sensors to detect the level of soiling of the floor surface. Such sensors are referred to here as dirt sensors. For example, such sensors can detect the dirt picked up by the robot during cleaning. For example, a suction robot has a channel through which aspirated air with dirt contained therein (e.g. dust) is directed from the floor to a dirt collection container. A dirt sensor can provide a measurement value that represents, e.g., the amount of dirt that is in the air flowing through the channel. Another dirt sensor can detect, e.g., vibrations and concussions caused by heavier dirt particles (e.g., with a piezo sensor). Alternatively or additionally, the amount of dirt in the air flow can be detected optically. For example, the level of soiling can be detected directly in the images captured by a camera. Another variant is combining one or more light sources and one or more light-sensitive receivers. The dirt particles contained in the air flow scatter the emitted light depending on their number and size, which causes the intensity of the light detected by the receiver to vary. Another possibility is detecting the dirt directly on a floor surface. For example, the level of soiling can be detected directly by a camera. Alternatively or additionally, the floor surface can be illuminated with a light source, and a level of soiling can be detected by the properties of the reflected light. For example, soiling by a liquid can be detected based on the conductivity of the floor surface. These and other sensors for detecting the level of soiling of the floor surface are known in principle and are therefore not discussed further.

In a simple example, the measurement signal of the dirt sensor indicates at least two states. Herein, the first state indicates no or only normal level of soiling, and the second state indicates a high level of soiling (i.e. the measured level of soiling exceeds a threshold). Distinguishing between the two states can be done based on a threshold of detected dirt particles, for example. In principle, more than two states can be distinguished (e.g. "clean", "normally soiled", "heavily soiled"), which allows for a finer gradation of the robot's response to an instance of soiling.

The autonomous mobile robot 100 can be associated with a base station 110, where it can charge its energy storage (batteries), for example. The robot 100 can return to this base station 110 after completing a task. If the robot no longer has a task to work on, it can wait in the base station 110 for a new deployment.

The control unit 150 can be designed to provide all the functions that the robot needs to move independently in its application area and perform a task. For this purpose, the control unit 150 includes, for example, the processor 155 and the memory module 156 to execute a software. The control unit 150 can generate control commands (e.g., control signals) for the working unit 160 and the drive unit 170 based on the information received from the sensor unit 120 and the communication unit 140. As already mentioned, the drive unit 170 can convert these control signals or control commands into a movement of the robot. The software contained in the memory 156 can also be modular. A navigation module 152 provides functions, e.g., for auto- matically creating a map of the application area of the robot, as well as for planning the path of the robot 100. The control software module 151 provides general (global) control func- tions, e.g., and can form an interface between the individual modules.

In order for the robot to perform a task autonomously, the control unit 150 can comprise functions for navigating the robot in its application area, which are provided by the aforementioned navigation module 152. These functions are known in principle and may comprise the following, among other functions:

creating (electronic) maps by collecting information about the environment by means of the sensor unit 120, for example, but not exclusively, by using the SLAM method;

managing one or multiple maps for one or more applica- tion areas of the robot associated with the maps;

determining the position and orientation (collectively referred to as the "pose") of the robot in a map based on the information on the environment determined with the sensors of the sensor unit 120;

a map-based path planning (trajectory planning) from a current pose of the robot (starting point) to a target point;

a contour-tracing mode in which the robot (100) moves along the contour of one or multiple obstacles (e.g., a wall) at an essentially constant distance d to this contour;

recognizing a zone, during which process the map is analyzed and divided into zones, wherein, for example, spatial boundaries such as walls and doorways are identified, whereby the zones describe the rooms of an apartment and/or useful divisions of these spaces.

The control unit 150 can, e.g., continuously update a map of the application area of the robot during the operation of the robot by means of the navigation module 152 and based on the information of the sensor unit 120, e.g., when the environment of the robot changes (obstacle is moved, door is opened, etc.).

In general, an (electronic) map usable by the robot 100 is a collection of map data (e.g. a database) for storing loca- tion-related information about an application area of the robot and the environment relevant to the robot in this application area. In this context, "location-based" means that the stored information is associated with a position or pose in a map. Thus, map data and map information always refer to a specific location or a specific area within an application area of the robot covered by the map. Thus, a map represents a large number of data sets with map data, and the map data can contain any location-related information. Herein, the location-related information can be stored at different degrees of detail and abstraction, whereby this can be adapted to a specific function. In particular, individual pieces of information can be stored redundantly. Often, a compi- lation of multiple maps that relate to the same area but are stored in different forms (data structure) is also referred to as "a map".

The navigation module 152 can plan the path of the robot based on the (stored) map data, the (currently measured) sensor data and the current task of the robot. Herein, it may be sufficient to determine waypoints (intermediate targets) and target points. This planning can then be converted into concrete drive commands by the control software module 151. The drive unit 170 is controlled based on these drive commands, and the robot is moved accordingly along the waypoints (from waypoint to waypoint) to a target, for example. It should be noted that the planned path herein may include a complete area, a treatment path and/or immediate short movement sections (a few centimeters, e.g. when bypassing obstacles).

An autonomous mobile robot can have different operating modes that are used to control the robot. The operating mode determines the (internal and outwardly visible) behavior of the robot. For example, a robot navigating with a map may have an operating mode to develop a new map. Another operating mode can be intended for target point navigation, i.e., the robot navigates from one point (e.g., the base station) to a second point (target point, e.g., a position at which a task is started, in particular a cleaning task). Further operating modes (i.e., treatment modes, in particular clean- ing modes) may be provided for performing the actual task of the robot.

A robot can have one or more treatment modes for treating the floor surface. This means that the robot selects an operating mode for the execution of a concrete (cleaning) task according to certain criteria, in which mode it then operates during the execution of the task. In the simplest example, the treatment mode to be selected is assigned to the robot by a user. Alternatively or additionally, a fixed sequence of treatment modes can be executed (e.g. exploring a (partial) area, cleaning of the margins of a (partial) area, surface cleaning of the (partial) area). The treatment modes may differ in the strategy for covering the floor surface, for example. The robot can be controlled randomly or system- atically, for example. Randomly controlled strategies usu- ally do not require a map. Systematic movement strategies usually use a map of the application area of the robot (or part of it), which can be developed during the treatment or can be available before the start of the treatment (e.g., from a longer movement pattern or a previous application). Typical examples of systematic movement strategies to cover the floor surface are based on a movement pattern associated with the respective operating mode (also referred to as treatment/cleaning patterns during the treatment/cleaning). A commonly applied movement pattern involves a move- ment along adjacent tracks laid out in parallel (meander). Another movement pattern provides for movement along a spiral track. Another movement pattern can be tracing a contour of a pre-definable area, wherein the contour can consist of real and virtual obstacles, e.g., to achieve a treatment close to the walls.

Additionally or alternatively, the treatment modes may differ by the selection and application of the cleaning tools. For example, there may be an operating mode (carpet cleaning mode) in which a suction unit with high suction power and quickly rotating brushes is used. In addition, there may be another operating mode (hard floor cleaning mode) which uses reduced suction power and slower brush rotation. In addition, a mop unit can be used on a hard floor. In addition, a decision can be made whether to apply cleaning liquid (e.g., water) to the floor or not, depending on the type of floor (e.g. stone, wood).

An operating mode (cleaning mode) can be changed in response to the values of a sensor signal for detecting the level of soiling of a floor surface (dirt sensor). For example, a special operating mode (spot cleaning mode) can be started at a heavily soiled site to remove a local instance of soiling. In this example, it is possible, for example, to switch from an operating mode with a meander-shaped movement pattern to an operating mode (spot cleaning mode) with spiral movement patterns. However, changing the treatment modes disrupts a systematic cleaning process, as it increases the complexity of the methods used (especially for navigation and track planning). It is therefore desirable to use a simpler method to consider a detected high level of soiling, which method can be integrated into a systematic treatment mode in a simple manner. The procedure for the path planning by the robot may depend on the current operating mode.

An operating mode for cleaning a floor surface (cleaning mode) is therefore characterized, among other factors, by the movement pattern (e.g., meander, spiral, etc.), with which the robot tries to cover the currently considered floor surface (e.g., a certain room or part of it) as completely as possible, the collision avoidance strategy used (e.g., reversal, bypassing the obstacle, etc.), as well as the strategy for treating previously untreated sections of the floor surface (which were omitted due to obstacles, e.g.). For example, omitted areas can be targeted and cleaned when the execution of the movement pattern associated with the treatment mode (e.g., a meandering path) is completed. Other approaches use a treatment map or cleaning map, in which already cleaned surfaces are marked so that they can be re-treated at a later time. The exemplary embodiments described here intend, among other goals, to avoid a mode change during cleaning, in particular in case of a detected increase in soiling, as far as possible.

Figure 3:
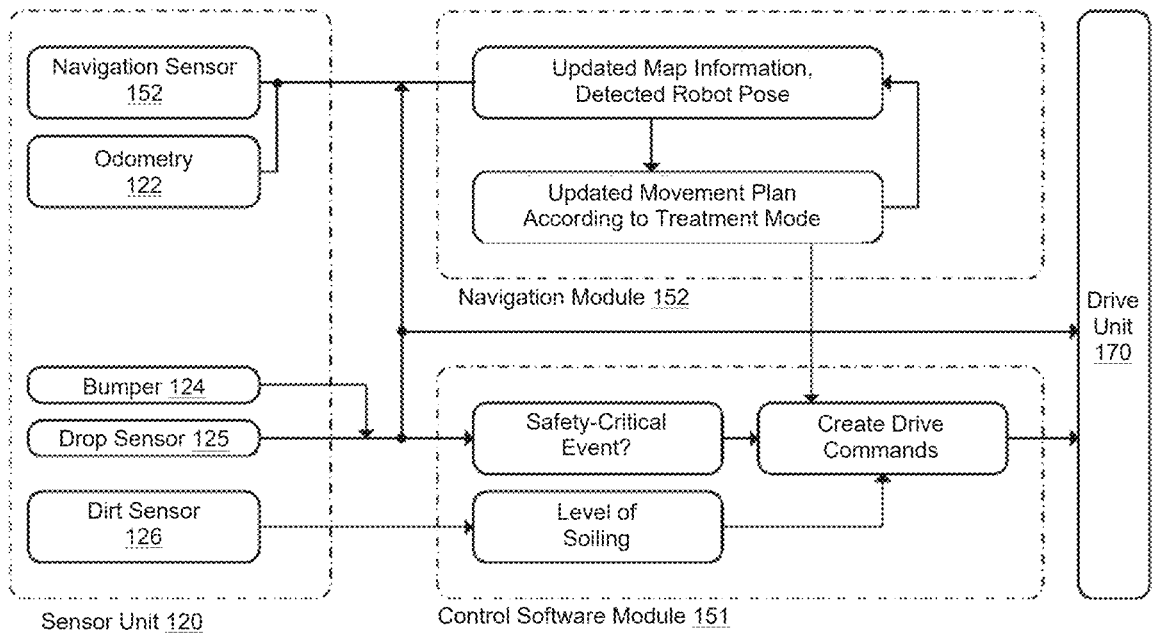

Reaction to a soiled area by reducing speed—FIG. 3 shows an example of how a sensor for detecting a level of soiling of the floor surface (dirt sensor) can be integrated into the architecture of an autonomous mobile robot. In the navigation module 152, the map data (e.g., position of obstacles, etc.) as well as the position of the robot are updated based on information about the environment of the robot (supplied by a navigation sensor 121 included in the sensor unit 120) and by means of odometry (e.g. according to a SLAM method, see also below, FIG. 4, step S1). For the odometry, the sensor unit 120 of the robot 121 can have an Odometer 122 (e.g., wheel encoder, optical odometer, etc.). Subsequently, the path planning of the robot is updated according to the current operating mode (treatment mode, cleaning mode, etc.). The path planning is based on the movement pattern associated with the current operating mode, the collision avoidance strategy used in the respective operating mode (e.g., reversal, moving along the contour of the obstacle, etc.), as well as the strategy used for treating previously omitted sections. The path planning can, for example, include determining waypoints to a target, determining path segments, movement vectors, and/or other elements for describing a path of the robot through the application area of the robot. The dynamics of the robot (in particular speed and acceleration) when moving along this path can usually be neglected in path planning for household robots (as opposed to large, fast-moving robots such as self-driving automobiles). Updating path planning may also include checking whether the robot is still on a previously planned path. In the event of deviations (especially greater than a tolerance), it is possible to determine how the robot can return to the planned path. In addition, the process of updating path planning can include checking whether a previously planned path can be executed collision-free. This process can be used, for example, to avoid a previously non-existent obstacle or an obstacle that was not considered in path planning. After the path planning update is complete, the first step can be repeated in the navigation module 152 (updating map data and robot position).

The results of the path planning by the navigation module 152 are forwarded to the control software module 151, which creates the drive commands for the drive unit 170 according to pre-definable rules. The drive unit 170 consists of two independently driven wheels (differential drive) positioned on one axle, for example. Such a drive and its control for following a path are known in principle. For example, a straight-line movement is generated when both wheels are driven at the same speed. A rotation about the center between the two wheels occurs when both wheels rotate in opposite directions at the same speed. Other drive units 170 such as other drives with wheels, chain drives or legs are known in principle.

When generating the drive commands by means of the control software module 151, certain constraints should be observed. For example, the accelerations to which the robot is subjected cannot and/or should not exceed a certain value. Another example is setting a maximum speed. These constraints may be dictated, for example, by the components of the robot used, but also by the robot's environment. For example, when operating the installed motors, a maximum engine speed and/or power that cannot be exceeded can be observed to ensure a sustainable operation. The maximum speed is achieved, for example, during long straight-line movements. When cornering and/or avoiding obstacles, a lower speed is usually achieved. In particular, the speed of the movement may be reduced depending on the necessary accuracy of the execution of the movement.

In addition, the control software module 151 can contain safety-relevant functions. Such safety-critical functions can trigger the robot's reactions (e.g., emergency braking, evasive maneuvers, etc.) to safety-critical events (detected hazardous situations). Possible safety-critical events are, e.g., the detection of a collision by means of a sensor (bumper 124) or the detection of a drop-off edge by means of another sensor (drop sensor 125). Thus, a possible reaction to a detected collision or to a detected drop-off edge can be an immediate stop of the robot (emergency stop). In addition, the robot can subsequently move in reverse by a pre-definable distance (approx. 1-5 cm) to establish a safe distance to the obstacle (or the drop-off edge). The navigation module 152 does not have to consider this standardized response to security-critical events. It is sufficient that the navigation module 152 can determine the current position of the robot and the position of the obstacles detected by the sensors (bumper or drop sensor), and thus can use said positions for the adjustment to and/or new determination of a path.

In order for a robot to detect particularly heavily soiled areas when treating a floor surface and to treat them more intensively, it can be equipped with a sensor for detecting the level of soiling of the floor surface (dirt sensor 126). An easy way to clean a surface more intensively is to reduce the speed of the robot such that the dirty surface is treated for a longer period of time. The reduction of the speed can be done directly while generating the drive commands by means of the control software module 151. This means that navigation module 152 does not have to be informed separately about the soiled area. There is no need to adjust the treatment mode and in particular the treatment strategy. This makes possible a quick and immediate response to a heavily soiled area. In particular, this can make possible a response that is comparable in quickness to one performed in the case of safety-critical events. Additionally or alternatively to the driving speed, the direction of travel of the robot can also be changed. For example, the robot can move back a little and then move forward again to clean the floor area covered by this maneuver multiple times. Additionally or alternatively, the currently planned trajectory can also be modified (which also changes the direction of travel). The modification can be conducted, for example, in such a way that the floor area recognized as heavily soiled is covered several times (by the "detour" caused by the modification of the trajectory) and the originally planned trajectory is resumed afterward.

For example, in the case of a detected high level of soiling, the speed can be adjusted by modifying the permissible maximum speed from a first value $v_1$ to a second maximum speed $v_2$. In particular, the maximum speed can be reduced ($v_2 < v_1$, e.g. $v_2 = 0.5 \cdot v_1$). This significantly reduces the speed during long straight-line movements in particular. For example, in areas where the robot needs to slow down due to obstacles, the speed would only be reduced if it is greater than the newly set maximum speed $v_2$. This avoids an unnecessary additional slowing of the robot. For example, the reduced maximum speed $v_2$ can be maintained as long as the state of heavy soiling is detected by the dirt sensor. Alternatively or additionally, the reduced maximum speed $v_2$ can be maintained for a pre-definable period (e.g., 5 seconds) or for a pre-definable distance (e.g., 5 cm) after the state of heavy soiling has again changed to a state of normal soiling. The maximum speed is then set back to its original value $v_1$. This response to an increased level of soiling does not affect the work of the navigation module, especially the path planning and/or the updating of the path planning.

Another example of modifying the speed in the event of a detected high level of soiling is stopping the robot when a change from a state of normal soiling to a state of heavy soiling is detected. This can be done, for example, analogously to the reaction to a detected collision or a detected drop-off edge (e.g., emergency stop). This ensures a quick response to a heavily soiled area.

Additionally or alternatively, the robot can back up. This means that the direction of travel is reversed. For example, the robot can be steered backward directly by the control software module by a pre-definable distance (e.g., 5 cm). This can be done analogously to the reaction to a detected collision or a detected drop-off edge. In particular, no complex planning by the navigation module 151 is required. As before, based on the treatment mode and the underlying treatment strategy, as well as the robot position and map information, the navigation module 151 can take over the path planning for the robot without having to consider any increased level of soiling. The advantage of backing up is that a delay in detecting the heavily soiled area is compensated for and a potentially very heavily soiled area is treated again.

Before the robot is steered in the reverse direction, it must stop. This can be done via an abrupt braking maneuver analogous to a hazardous situation. Alternatively, this can be done via a slow braking and acceleration (in the opposite direction), which creates the visual impression of a "softer" forward and backward movement. Such a driving maneuver can also be implemented as a standard reaction analogously to the reaction to a hazardous situation (stopping and reversing). Therefore, no adjustment of the treatment mode implemented in the navigation module 152 is necessary for this.

When backing up, the robot can move backward in a straight line or along the most recently taken trajectory. The latter is done, for example, by inverting the most recently generated drive commands. The distance and/or the duration of the reverse movement can be a preset value. Alternatively, sensor measurements can be taken as a condition for stopping the reverse movement and resuming normal movement. For example, the signal of the dirt sensor can be used. For example, the robot can back up until the detected signal for the level of soiling drops again below a pre-definable threshold value or a collision with an obstacle is imminent. In one example, the robot moves backward until the dirt sensor no longer detects an increased level of soiling and then continues to move for a defined distance (or duration). During the reverse movement, collision avoidance can be active.

In an alternative configuration, the navigation module 151 can also be informed about the level of soiling and perform a path planning for the reverse movement of the robot. This has the advantage that obstacles that may lie behind the robot can be taken into account when controlling the robot. Alternatively or additionally, the reverse movement can be controlled by the control software module 152 as described above, wherein the movement is additionally monitored by a safety monitoring module. The safety monitoring module can cause the movement to stop, for example, if a collision with an obstacle or a drop into an open space is imminent. The security monitoring module can be a stand-alone module or part of the control software module 151, and it operates independently of the navigation module 152.

After the robot has stopped and/or moved backward, the robot can move forward again. Herein, a reduced speed can, for example, be used for at least a pre-definable distance or duration, as described above. Alternatively or additionally, the reverse direction of the robot can be activated with each new detection of a heavily soiled area, which leads to a continuous, back-and-forth movement, analogous to a human action when treating a heavily soiled area.

Reaction to high levels of soiling by non-marking in the treatment map—An alternative approach to controlling an autonomous mobile robot to treat a floor surface in response to the signal of a dirt sensor uses a treatment map (e.g., cleaning map). In a treatment map, all areas are marked that have already been treated. This can be displayed to the user, for example, such that the user gets an overview of the robot's activity. At the same time, this map can be used by the robot to identify which areas still need to be treated. This way, areas can be identified that have not yet been treated due to the location of obstacles, for example. These areas that have not yet been treated can be included in the current treatment when the robot passes said areas—interrupting a current treatment pattern. Alternatively, after treating an area according to a treatment pattern (which depends on the operating mode), an area that has not yet been treated can be identified based on the treatment map and the robot can be directed to it for treatment. Such procedures are known in principle.

Figure 4:
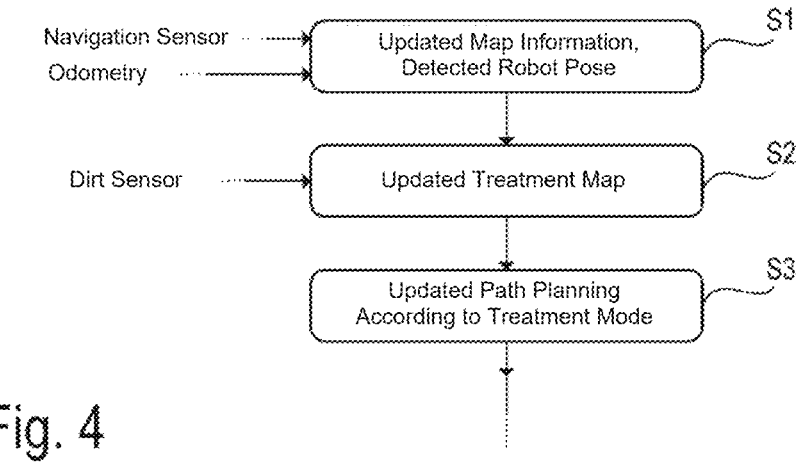

FIG. 4 shows an example of an approach to controlling an autonomous mobile robot depending on the signals of a dirt sensor without changing the treatment mode on which the current treatment strategy is based. Herein, the map data regarding the environment and the robot position is updated in a first step (FIG. 4, S1) in response to the information provided by the navigation sensor regarding the environment of the robot and the odometry sensor of the robot. In the second step (FIG. 4, S2) the treatment map (e.g., cleaning map) is updated. For this purpose, the areas between the last known position of the robot and the position determined in the preceding step S1 are marked as treated, for example. Therein, the position of the treatment unit (on the robot) can be taken into account. When marking areas as treated (or not treated) in the treatment map, data supplied by the dirt sensor can be taken into account. The path to be taken by the robot is then updated according to the specifications of the current treatment mode. For example, the strategy associated with the current treatment mode for treating previously omitted surfaces may provide that they are treated the next time the robot passes the omitted spot while moving according to the movement pattern used in the respective mode (e.g., meander).

In particular, a surface can be marked as treated if the dirt sensor detects no or a normal level of soiling for this surface. If, on the other hand, a high level of soiling is detected, the area in question is marked as such in the treatment map. Areas marked in this way are treated again. In the simplest case, the re-treating is done by marking the area in question as "untreated". It therefore has the same marking as an area of the floor surface that the robot has not yet moved across. This procedure has the effect that, in accordance with a treatment strategy for the systematic and complete coverage of the floor surface, this area is identified as not yet treated, which is why the robot is automatically directed to it again later (according to the strategy used in the respective treatment mode for treating previously untreated surfaces). There is no need to change or adjust the treatment strategy and track planning, which directly takes into account a detected high level of soiling.

Figure 5:
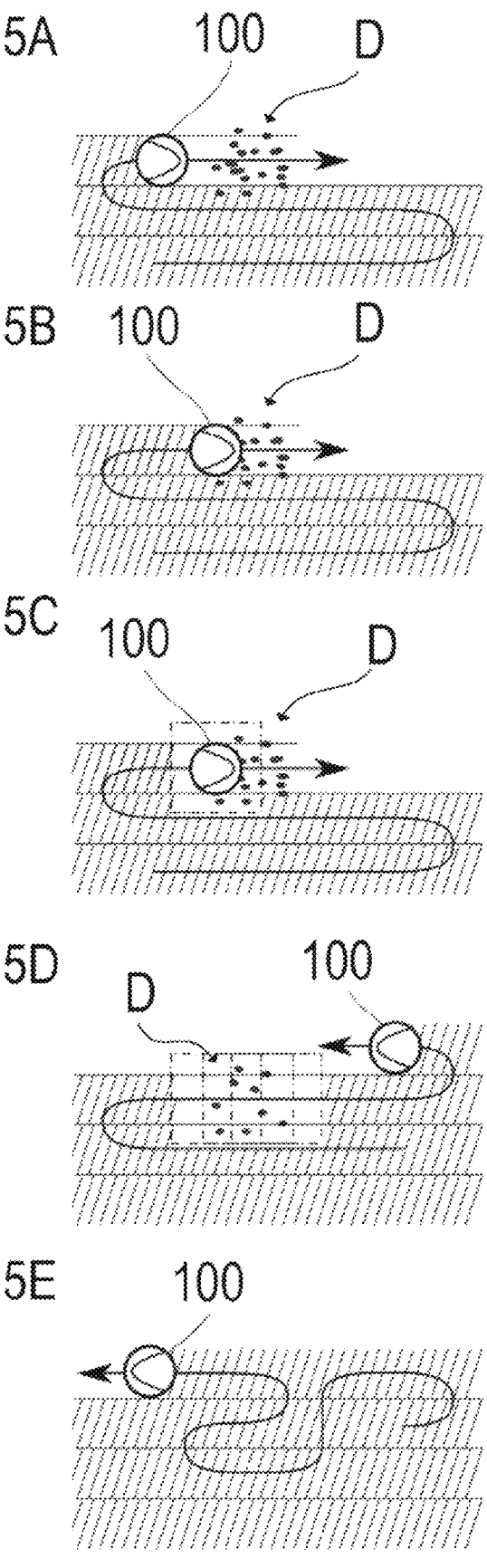

FIG. 5 shows an example of a sequence of the treatment of the floor surface and the corresponding marking in a treatment map. FIG. 5A shows the robot 100 systematically treating the floor surface in tracks aligned next to each other in a meandering shape. The areas marked "treated" on the treatment map are shown with hatched lines. In the example shown here, the robot moves toward a locally heavily soiled area D. In the situation shown in FIG. 5B, the robot 100 has reached the heavily soiled area D and will therefore detect it by means of the dirt sensor.

On the one hand, the current position of the robot will not be marked as "treated" in response to the detection of the heavily soiled area D; on the other hand, areas that were previously marked as "treated" can be marked as "not treated" (or "to be re-treated") such that they are treated again later. In the example shown in FIG. 5C, the areas (e.g., with fixed width) that are immediately adjacent to the robot and immediately behind the robot 100, are again marked as "untreated". This has the advantage that marginal areas of the heavily soiled area D, which may not have been detected before, are also treated again. For example, a square with a side length of two robot diameters, the center of which corresponds to the center of the robot, is marked as "untreated" (see dotted square in FIG. 5C). It should be noted that the areas marked as treated are usually adjusted to the shape, size and position of the treatment unit in/on the robot. Similarly, the areas marked as "untreated" as a result of a detected high level of soiling are at least partially adjusted to the shape, size and position of the treatment unit.

FIG. 5D shows the robot 100 on the next cleaning track of the meander pattern. The area D, previously identified as heavily soiled, is marked as "untreated" (see FIG. 5D, dotted squares). This is detected by the robot 100 based on the treatment map. Accordingly, the robot 100, will re-treat this area D marked as "untreated" when it reaches said area. FIG. 5E shows a possible treatment pattern resulting from the aforementioned re-treating of the area D. In an alternative embodiment, the robot can also move straight along the track sketched in FIG. 5D and return to the area D marked as "untreated" at the end of the meander-shaped treatment pattern, whereby the area D is treated again. The cleaning performance in the heavily soiled area D is significantly increased by treating said area twice. A special adjustment of the treatment mode is not necessary, as an inherent characteristic of a systematic map-based treatment strategy (detecting and treating omitted areas) is implemented.

Intensity map—The methods for controlling an autonomous mobile robot described so far intend to clean individual areas (especially those that have been identified as highly soiled) more intensively than other areas. When individual areas need to repeatedly be subjected to such intensive cleaning, valuable information is gained that can be used to optimize the use of the robot in the long term and to better adapt it to the needs of the user. For this purpose, this information must be systematically recorded and analyzed.

A first step is to record the actual local treatment intensity in a map. This means that for all positions in a field of application, it is recorded whether they have been treated (if not, the intensity of the treatment is zero), and with which intensity this is performed.

A measure for the intensity can be, for example, the duration of treatment, for example, if the robot stops at a heavily soiled location or drives back and forth. Additionally or alternatively, the frequency of treatment can be a measure of intensity or contribute to the intensity if, for example, the robot moves to a heavily polluted location several times. The speed of the treatment can also be a measure of intensity or contribute to the intensity if, for example, the robot travels to a location at reduced speed. Finally, the treatment power during the treatment can also be a measure of intensity or contribute to the intensity, if, for example, the suction power of the robot is increased. If an area is treated more slowly, the robot spends more time on that area; if an area is treated several times, the robot also spends more time on the respective surface. A measure of the intensity of the treatment (cleaning) can therefore be the product of the treatment time of a section and the treatment power used (e.g. suction power of a suction unit, generally: possible dirt removal per unit of time). This product (time multiplied by treatment power) can also be considered as the "work" that was done during the treatment of a unit of area of the floor surface.

For example, an easy option of creating such an intensity map is to store the current position of the robot at regular intervals (e.g., once per second). This creates a map with a point cloud. In areas where the robot has often been located and/or in which it has stayed longer (e.g., due to reduced speed), the points of the stored robot positions are denser than in other places. The spatial density (points per unit of area) of the robot positions stored in this way is thus a possible measure of the intensity of the treatment.

The reason for a higher intensity of treatment can be (as described above) the reaction to the data supplied by a dirt sensor, whereby an area detected as highly soiled is treated multiple times and/or more slowly.

Another reason for increased intensity of treatment may be the information about the robot's environment provided by a navigation sensor. For example, the speed may be reduced near obstacles and especially in the case of cleaning near walls and/or in corners. This has the advantage that the reduced speed allows for a more accurate navigation. This allows for cleaning closer to obstacles and in corners. In addition, the cleaning performance is increased, such that dirt collected in corners and marginal areas is removed more effectively.

Another reason for treating an area more intensively is an explicit user instruction. For example, the user can instruct the robot 100 (e.g., via the human-machine interface 200, see FIG. 2) to treat the area in which he is currently located more intensively and/or to repeat the treatment. Alternatively or additionally, the user can instruct the robot to clean a room (e.g., hallway) or an area (e.g., dining area) more thoroughly and intensively. For this purpose, the map data of the robot can be displayed, for example, in the form of a floor plan of the application area of the robot on an HMI (e.g., tablet). The user can then select the areas to be treated more intensively directly in the displayed map. For example, the user can choose a cleaning program (treatment mode) that performs a more intensive treatment of the floor surface.

In addition, information stored in the map can cause the robot to treat a location or area more intensively. For example, this can be information entered by the user, such as an explicit instruction to treat a room (or part of it) more intensively. Alternatively or additionally, indirect information such as the labeling of rooms (e.g., "kitchen"), areas (e.g., "entrance area") and/or objects (e.g., "table"), for example, can be used by the user to adjust an intensity of treatment. For example, it can be inferred from a description of a room as a "kitchen" or the designation of an area as "entrance area" or "dining area" that it has a particularly high need for cleaning.

In addition, information about the need for intensive treatment can be learned by the robot. For example, the robot can determine that an area needs to always be cleaned more intensively than other areas due to higher level of soiling. For this purpose, the intensity map can be saved after each treatment application, for example. The saved maps can then be analyzed for patterns and their change over the course of several treatment applications. Thus, it can be recognized that a room, at least in part, requires more intensive treatment at almost every treatment application, for example. Based on this, the robot can always treat this whole room or parts of it in a more intensive treatment mode, either independently or upon confirmation by the user. Alternatively, a recommendation can be issued to the user to clean the room more often. For example, daily treatment can be suggested if so far it has only been performed every two days.

As an alternative to storing the entire intensity map, it may be sufficient to identify and store those areas with particularly intensive treatment (e.g., due to high level of soiling) after a treatment application. Areas and/or locations can be stored, for example, whose treatment intensity is greater than a minimum value or corresponds to the mean of the total intensity, and/or the intensity of a standard treatment mode.

Such an intensity map can serve as a substitute for a treatment map and a soiling-level map (i.e., a map in which different positions or areas in the application area are associated with a level of soiling of the floor surface determined by a sensor). Alternatively, it can be a good addition to these maps to present the necessary information to the user in a simpler and more direct manner and to improve the robot's independent learning behavior.

The invention claimed is:

1. A method for controlling an autonomous mobile robot, comprising the following:
   controlling the robot in a treatment mode for treating a floor surface with a floor treatment module of the robot;
   detecting a dirt sensor signal representing the level of soiling of the floor surface by means of a dirt sensor arranged on the robot; and
   modifying a speed of the robot during the treatment of the floor surface based on the dirt sensor signal,
   wherein the robot, in the treatment mode, moves over the floor surface at a speed which is less than or equal to a maximum speed associated with the treatment mode, and
   wherein modifying the speed of the robot is achieved by reducing the maximum speed and a current speed of the robot is only reduced if the current speed of the robot is greater than the reduced maximum speed.

2. The method according to claim 1, wherein the dirt sensor signal can assume a first state and a second state depending on the level of soiling of the floor surface.

3. The method according to claim 2, wherein the first state of the dirt sensor signal indicates a normal level of soiling and the second state of the dirt sensor signal indicates a high level of soiling.

4. The method according to claim 2, wherein the treatment mode is associated with a maximum speed of the robot, and
   wherein the maximum speed depends on the state of the dirt sensor signal.

5. The method according to claim 2, wherein the speed of the robot is reduced from a first value to a second value in response to the second state of the dirt sensor signal.

6. The method according to claim 5, wherein the speed, after it has been reduced, is reset again to the first value according to at least one pre-definable criterion.

7. The method according to claim 6, wherein the at least one pre-definable criterion comprises at least one of the following: the dirt sensor signal resumes the first state; the dirt sensor signal resumes the first state and a pre-definable time has passed since then; the dirt sensor signal resumes the first state and the robot has moved a defined distance since then; a pre-definable time has passed since the reduction of the speed; the robot has moved a pre-definable distance since the reduction of the speed.

8. The method according to claim 2, wherein the robot stops in response to a change of the dirt sensor signal from the first to the second state.

9. The method according to claim 8, wherein the treatment mode is resumed in a normal direction of travel at reduced speed after a stop or reverse movement.

10. The method according to claim 2, wherein the robot moves in reverse in response to the change of the dirt sensor signal from the first to the second state.

11. The method according to claim 10, wherein the reverse movement is achieved by the fact that the robot moves backward in a straight line or along the most recently taken trajectory for a pre-definable distance and/or duration.

12. The method according to claim 10, wherein obstacles are taken into account during the reverse movement in such a manner that a collision is avoided.

13. The method according to claim 10, wherein the robot stores information regarding the location of obstacles in a map, and uses the information stored in the map to avoid collisions during reverse movements without using current sensor information regarding obstacles.

14. The method according to claim 1, wherein controlling the robot in a treatment mode comprises:
   executing a path planning based on map information and the robot position according to a movement pattern associated with the treatment mode, an obstacle avoidance strategy associated with the treatment mode, and a strategy for re-treating previously untreated areas associated with the treatment mode; and
   converting the planned path into drive commands.

15. The method according to claim 1, further comprising:
   planning, by a navigation module of the robot, a path of the robot based on a stored map data.

16. The method according to claim 15, further comprising:

updating, by a control unit of the robot, a map of an application area of the robot during the operation of the robot by means of the navigation module.

17. The method according to claim 15, wherein the robot further comprises a control unit providing functions for navigating the robot in an application area, wherein the functions are provided by the navigation module.

18. The method according to claim 1, further comprising:

changing a direction of travel of the robot based on the dirt sensor signal.

19. The method according to claim 18, further comprising:

modifying a planned trajectory based on the dirt sensor signal.

20. The method according to claim 18, further comprising:

covering a floor area recognized as heavily soiled several times.

21. The method according to claim 1, wherein the speed, after it has been reduced, is reset again to its original value based on a pre-definable time or a pre-definable distance.

22. The method according to claim 1, wherein, when the dirt sensor indicates a high level of soiling, the robot backs up until the detected signal for the level of soiling is low or normal.

\*  \*  \*  \*  \*